United States Patent
Aune

(10) Patent No.: US 6,952,735 B1
(45) Date of Patent: Oct. 4, 2005

(54) DYNAMICALLY DISTRIBUTED IP-POOL IN GPRS

(75) Inventor: Leif Einar Aune, Grimstad (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 826 days.

(21) Appl. No.: 09/652,735

(22) Filed: Aug. 31, 2000

(30) Foreign Application Priority Data

Sep. 1, 1999 (NO) ...................................... 994240

(51) Int. Cl.$^7$ ...................... G06F 15/177; G06F 15/16; H04L 12/28; H04Q 7/00; H04Q 7/24
(52) U.S. Cl. ...................... 709/228; 709/222; 709/245; 370/401; 370/313; 370/338
(58) Field of Search ................................ 709/222, 228, 709/245, 202, 232; 370/401, 313, 338; 455/433

(56) References Cited

U.S. PATENT DOCUMENTS

| | | | | |
|---|---|---|---|---|
| 5,093,912 A | | 3/1992 | Dong et al. .................. | 395/650 |
| 5,159,592 A | * | 10/1992 | Perkins ........................ | 370/338 |
| 5,561,854 A | * | 10/1996 | Antic et al. .................. | 455/433 |
| 5,708,655 A | * | 1/1998 | Toth et al. ................... | 370/313 |
| 5,828,837 A | * | 10/1998 | Eikeland ...................... | 709/202 |
| 6,178,455 B1 | * | 1/2001 | Schutte et al. ............... | 709/228 |
| 6,381,650 B1 | * | 4/2002 | Peacock ....................... | 709/245 |
| 6,434,627 B1 | * | 8/2002 | Millet et al. ................. | 709/245 |
| 6,496,511 B1 | * | 12/2002 | Wang et al. .................. | 370/401 |

OTHER PUBLICATIONS

Bettstetter, C. et al., "GSM Phase 2+ General Packet Radio Service GPRS: Architecture, Protocols, and Air Interface," IEEE Communications Surveys, 3$^{rd}$ Qtr. 1999, http://www-.consoc.org/pubs/surveys/3q99 issue/bettstetter, pp. 1-15.
CISCO: New Features in Release 12.1(1)T; http://www.cisco.com/univercd/cc/td/doc/...are/ios121/121newft/121t/121t1/gprs1.htm; Aug. 26, 1999, p. 14.

* cited by examiner

Primary Examiner—John Follansbee
Assistant Examiner—Philip Lee

(57) ABSTRACT

This invention relates to an arrangement to distribute IP-addresses in a GPRS network. The GPRS system has a pool of of IP-addresses to be used by subscribers. This pool is located on a global processor in the GPRS system which is distributing addresses to all other processors in the external networks. According to the invention there is configured one local pool per processor for each external network. Said local pools is supplied with a pack of addresses from the global pool. When a local pool is going empty, the pool is supplied with another pack of addresses from the global pool. If the local pool exceed a predefined limit in the number of contained addresses, a pack of addresses is released. The global pool can then distribute these addresses to other local pools.

7 Claims, 1 Drawing Sheet

DYNAMICALLY DISTRIBUTED IP-POOL IN GPRS

TECHNICAL FIELD

The present invention relates to the filed of mobile data communication, and in particular an arrangement for distributing IP-addresses in a GPRS network.

TECHNICAL BACKGROUND

The GPRS (General Packet Radio Service) offers a high-speed, packet-switched, mobile data communication network, where the subscribers can connect themselves to an external network from a mobile terminal. The subscribers need an IP-address to route packets to and from the external network. They can specify this address themselves, called static address, or receive an address from the external network or the GPRS-system. The last case is then called a dynamic address allocation.

The GPRS system has an internal pool of IP-addresses to be used by the subscribers to get a dynamic IP-address. This pool is located on a global processor in the GPRS-system and is distributing addresses to all the other processors. The global processor will also keep track of which addresses are used and which are available for the subscribers.

The Problem Area

The global processor has to keep track of which addresses that are in use, so that it will not give out the same address to two subscribers. The operator of the GPRS-system will only give in one IP-pool per external network, so the processor have to keep track of the dynamic addresses for the whole GPRS-network. This means that it will be generated a lot of unwanted traffic towards the global processor which holds the IP-pool. Each subscriber, possibly connected to another processor, have to obtain its address and release it through the global processor.

Possible Solutions

One way to solve the problem would have been to configure one IP-pool per processor for each external network. Two arguments show that this is a bad solution. The number of processors in the system should be highly dynamic, and there should be no need for configuration of the processor before start. This means that each processor could not have its own IP-pool. Also, the load could be unevenly distributed among the processors, with the result that one processor has run out of addresses, while the other processors have many unused addresses left. The address-resources would in this case have a low degree of utilization.

The other way to solve the problem is to allow for all the traffic generated by having only one global address-pool. The advantage with this solution is that all the addresses would be in use before one processor would that report that no addresses were available.

Problems with These Solutions

The above-mentioned solutions will either require a configuration of the processors before start, or result in unwanted traffic towards the global processors in the GPRS-system.

Other Prior Art

U.S. Pat. No. 5,093,912 describes a method for expanding and contracting a resource pool, mainly with respect to system storage. The patent has no global resource holder to keep track of the overall resource management, but uses an operating system to handle the deletion of a pool of resources. Moreover, the expansion of the pool by acquiring further resources also involves an external system, such as an operating system.

Allocation of an IP address for an end user in a computer network could not directly be compared to allocation of system storage in a computer. The IP addresses will most likely be kept for several hours, possibly weeks in a GPRS system. Typical memory allocations in a computer system could last for seconds or minutes. The address should also be kept by the subscriber, even though one of the local processors in the GPRS node restarts. This is a very unlikely behaviour of a general computer resource. Thereby, a comparison of an IP-address pool and a typical computer resource pool is not absolutely adequate.

An article from CISCO: New Features in Release 12.1 (1)T, http://www.cisco.com . . . are/ios121/121newft/121t/121t1/gprsl.htm, Aug. 26, 1999, page 14, describes how one can use one DHCP server for all the external networks, instead of letting each external network connected to the GGSN include its own DHCP server. However, no distribution of addresses is done between the different DHCP servers, i.e. the global DHCP server and the local DHCP servers.

THE INVENTION

OBJECTS OF THE INVENTION

It is therefore an object of the present invention to provide an arrangement for providing IP-addresses in a GPRS network which dramatically reduces the traffic towards the global processor that holds the pool of IP-addresses.

Another object is to provide a such arrangement that secures a high and evenly degree of utilisation of the address resources.

BRIEF DESCRIPTION OF THE INVENTION

These objects are achieved in an arrangement for distributing IP-addresses in a GPRS network, which is characterized by the features of the enclosed claim 1.

Additional embodiments of the invention appears from the subsequent dependant claims.

BRIEF DESCRIPTION OF THE DRAWINGS

The invention will now be described in detail in reference to the appended drawings, in which.

DETAILED DESCRIPTION

The new solution will still keep one IP-pool per external network for the whole GPRS-system. When a processor receives a request for a dynamic IP-address from a mobile-subscriber, it will signal the global processor that it needs an IP-address. The global processor will now give out a pack of addresses to the requesting processor instead of one address. The processor receiving the addresses will then give one of the addresses to the subscriber and keep the rest of the addresses in an internal storage. When a new subscriber asks for another address the processor now has its own, small IP-pool, from which it can give out an address. After a while, when the processor receives yet another request for an address, and its local IP-pool is empty, it requests the global processor again, and receives another pack of addresses.

Regarding release of the addresses the system works the same way. The remote processor will not release an address before a whole group of addresses should be released. This assures that the addresses will be spread out between processors, which needs them.

The size of the address-blocks are of crucial matter to make a fine balance between generated traffic to get and release address-blocks, and to distribute the addresses to those processors which needs them most. As an example, the central processor can have 100 addresses available. Of course, if the processor divides the pool into 50 addresses in each block, very little traffic will be generated after two external processes have received a block of addresses, but then the global pool would be empty, and no other processes can access any addresses. On the other hand, if the pool were split in blocks containing only five addresses, the external processes would have to ask the global processor about more IP-addresses, or release the addresses a lot more often. The size of the blocks should be dynamically adjusted to achieve as little traffic as possible, without being to liberal with the address resources.

The system could with advantage comprise an arrangement which permit the release of addresses that not has been in use for a long time. E.g. the application processors could be adapted to report to the global processor with regular intervals. Should an application processor drop out and not report, the global processor is allowed to release the corresponding IP-addresses for other use.

Figure 1:
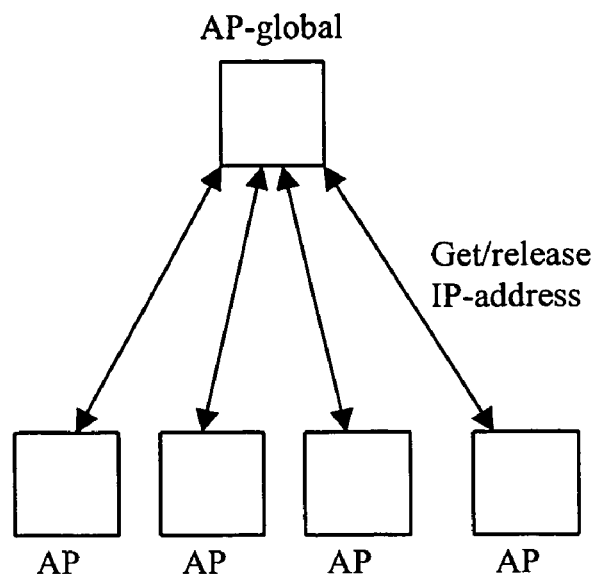
FIG. 1 is a schematical overview of a system for distributing addresses using one global IP-pool (prior art).

An overview of the messages that may be generated in FIG. 1 can be seen in the table below. In the table it is three processors communicating with the global processor, each will have two subscribers attached, which needs one address each. Some of them will release their addresses after a while. The processors are described as AP's (Application Processor), and the one owning the IP-pool is defined as the global processor (AP-global). The last column is showing the number of messages generated if the new invention is used.

TABLE 1

Overview of number of messages

| Sender | Message | No of Messages | No of Messages (new variant) |
|---|---|---|---|
| AP1 | Get_address | 1 | 1 |
| AP2 | Get_address | 2 | 2 |
| AP3 | Get_address | 3 | 3 |
| AP1 | Get_address | 4 | 3 |
| AP2 | Get_address | 5 | 3 |
| AP1 | Release_address | 6 | 3 |
| AP3 | Get_address | 7 | 3 |
| AP1 | Release_address | 8 | 3 |
| AP2 | Release_address | 9 | 3 |

Figure 2:
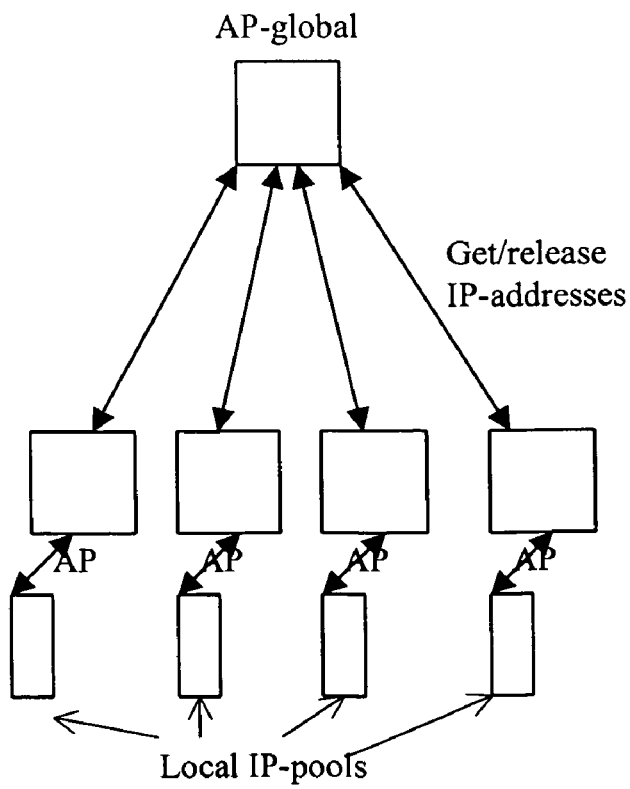
FIG. 2 shows the system according to the invention using one local IP-pool per processor for each external network.

FIG. 2 shows the new set-up with one internal IP-pool per processor. From the table one can clearly see the stop of message flow towards the global processor after the local processors have received their own, small local IP-pool. No messages will be sent as long as the processors do not need more addresses, or have a free, local address-block, which can be released.

The internal storage for each processor's temporary IP-pool could be in RAM. It should be aimed at a fast way to access the pool, but it should also be kept in mind that the pool must survive a crash of the node. One way to assure this is to regularly take copies of the local pools and store them persistent, while during traffic the pool is only modified in RAM.

Broadening

This approach reduce intercommunication towards a central resource-handler, and can be used regardless of what kind of resources that should be distributed. As long as the receiving units can store spare resources for future use, and the global resource-pool is large enough to give out excessive resources

What is claimed is:

1. An arrangement for distributing IP-addresses in a General Packet Radio Service (GPRS) network, said arrangement comprising:
   a global processor in the GPRS network that stores a global pool of available IP-addresses; and
   a plurality of application processors in associated external networks connected to the GPRS network, each of the application processors comprising:
      means for storing a plurality of IP-addresses in an internal pool of IP-addresses, wherein the number of IP-addresses in the internal pool of a given application processor is dynamically adjusted to minimize the amount of traffic required to request and distribute IP-addresses between the global processor and the given application processor while ensuring that a sufficient number of IP-addresses are available to serve all requests for additional IP-addresses from users in the application processor's associated external network;
      means for supplying an IP-address from the application processor's internal pool to a user in the application processor's associated external network upon request; and
      means for requesting an additional IP-address from the global processor when the application processor's internal pool of IP-addresses is empty or nearly empty;
   wherein the global processor comprises:
      means for transferring from the global pool to a requesting application processor, a block of IP-addresses comprising a plurality of IP-addresses in response to a request for an additional IP-address from the requesting application processor; and
      means for dynamically adjusting the size of the blocks of IP-addresses transferred to the application processors to minimize the amount of traffic required for the application processors to request IP-addresses from the global processor and for the global processor to distribute IP-addresses to the application processors, while also ensuring that each application processor has a sufficient number of IP-addresses available to serve all requests for additional IP-addresses from users in each application processor's associated external network;
   wherein the global processor transfers a larger block of IP-addresses to an application processor that receives a greater number of requests for IP-addresses from users in the application processor's associated external network.

2. The arrangement according to claim 1, wherein a given application processor is adapted to release a block of IP-addresses to users and notify the global processor of the release, if the number of IP-addresses in the internal pool of the given application processor exceeds a predefined limit.

3. The arrangement according to claim 2, wherein the predefined limit is equal to two times the size of the block of IP-addresses last received from the global processor.

4. The arrangement according to claim 1, wherein the global processor is arranged to release addresses that have not been used in a preceding interval of time.

5. The arrangement according to claim 1, wherein each application processor is arranged to store the internal pool of IP-addresses in a Random-Access Memory (RAM), and to make back-up copies of the internal pool on a persistent storage medium at regular intervals.

6. An arrangement for distributing resources in a network, said arrangement comprising:
   a global processor in the network that stores a global pool of available resources; and
   a plurality of application processors in associated external networks connected to the network, each of the application processors comprising:
      means for storing a plurality of resources in an internal pool of resources, wherein the number of resources in the internal pool of a given application processor is dynamically adjusted to minimize the amount of traffic required to request and distribute resources between the global processor and the given application processor while ensuring that a sufficient number of resources are available to serve all requests for additional resources from users in the application processors associated external network;
      means for supplying a resource from the application processor's internal pool to a user in the application processor's associated external network upon request; and
      means for requesting an additional resource from the global processor when the application processor's internal pool of resources is empty or nearly empty;
   wherein the global processor comprises;
      means for transferring from the global pool to a requesting application processor, a block of resources comprising a plurality of resources in response to a request for an additional resource from the requesting application processor; and
      means for dynamically adjusting the size of the blocks of resources transferred to the application processors to minimize the amount of traffic required for the application processors to request resources from the global processor and for the global processor to distribute resources to the application processors, while also ensuring that each application processor has a sufficient number of resources available to serve all requests for additional resources from users in each application processor's associated external network;
   wherein the global processor transfers a larger block of resources to an application processor that receives a greater number of requests for resources from users in the application processor's associated external network.

7. A method of distributing IP-addresses from a global processor in a General Packet Radio Service (GPRS) network to a plurality of application processors in associated external networks connected to the GPRS network, wherein each of the application processors provides IP-addresses to users in the application processor's associated external network, said method comprising the steps of:
   storing a global pool of available IP-addresses in the global processor in the GPRS network;
   receiving a request for an additional IP-address from a given application processor;
   determining how many IP-addresses to send to the given application processor in a block of IP-addresses based on the given application processor's rate of requests for additional IP-addresses from users, the rate of usage of IP-addresses of other application processors, and the number of available IP-addresses in the global pool, said block also being dynamically sized to minimize the amount of traffic required for the plurality of application processors to request IP-addresses from the global processor and for the global processor to distribute IP-addresses to the application processors; and
   transferring the block of IP-addresses from the global pool to the given application processor in response to the request for an additional IP-address from the given application processor.

* * * * *